Figure 1:
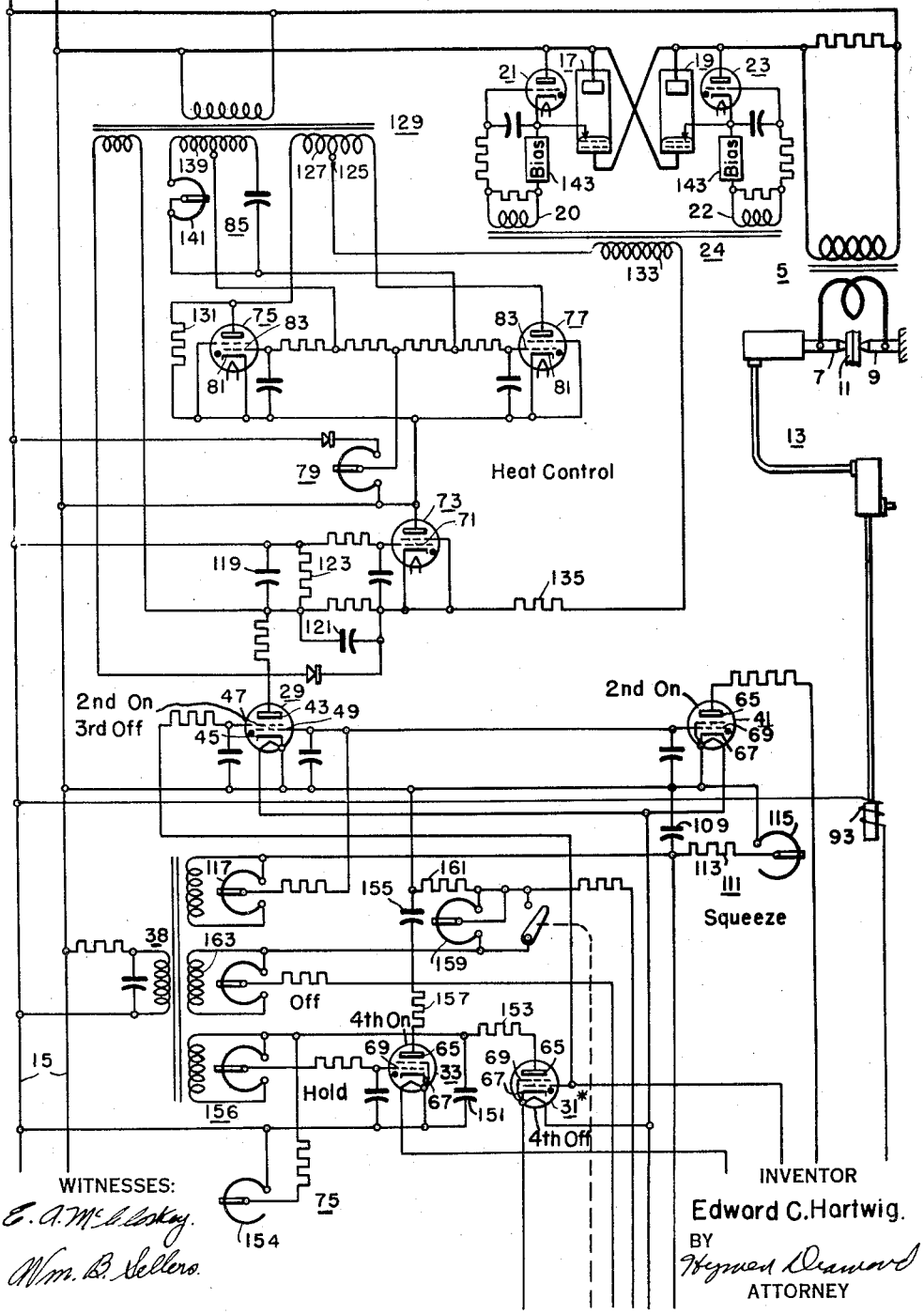

Dec. 23, 1958     E. C. HARTWIG     2,866,134
ELECTRONIC SEQUENCE TIMER

Original Filed April 7, 1950     2 Sheets-Sheet 1

WITNESSES:
E. A. McCloskey
Wm. B. Sellers

INVENTOR
Edward C. Hartwig.
BY Hyman Diamond
ATTORNEY

Dec. 23, 1958     E. C. HARTWIG     2,866,134
ELECTRONIC SEQUENCE TIMER
Original Filed April 7, 1950     2 Sheets-Sheet 2
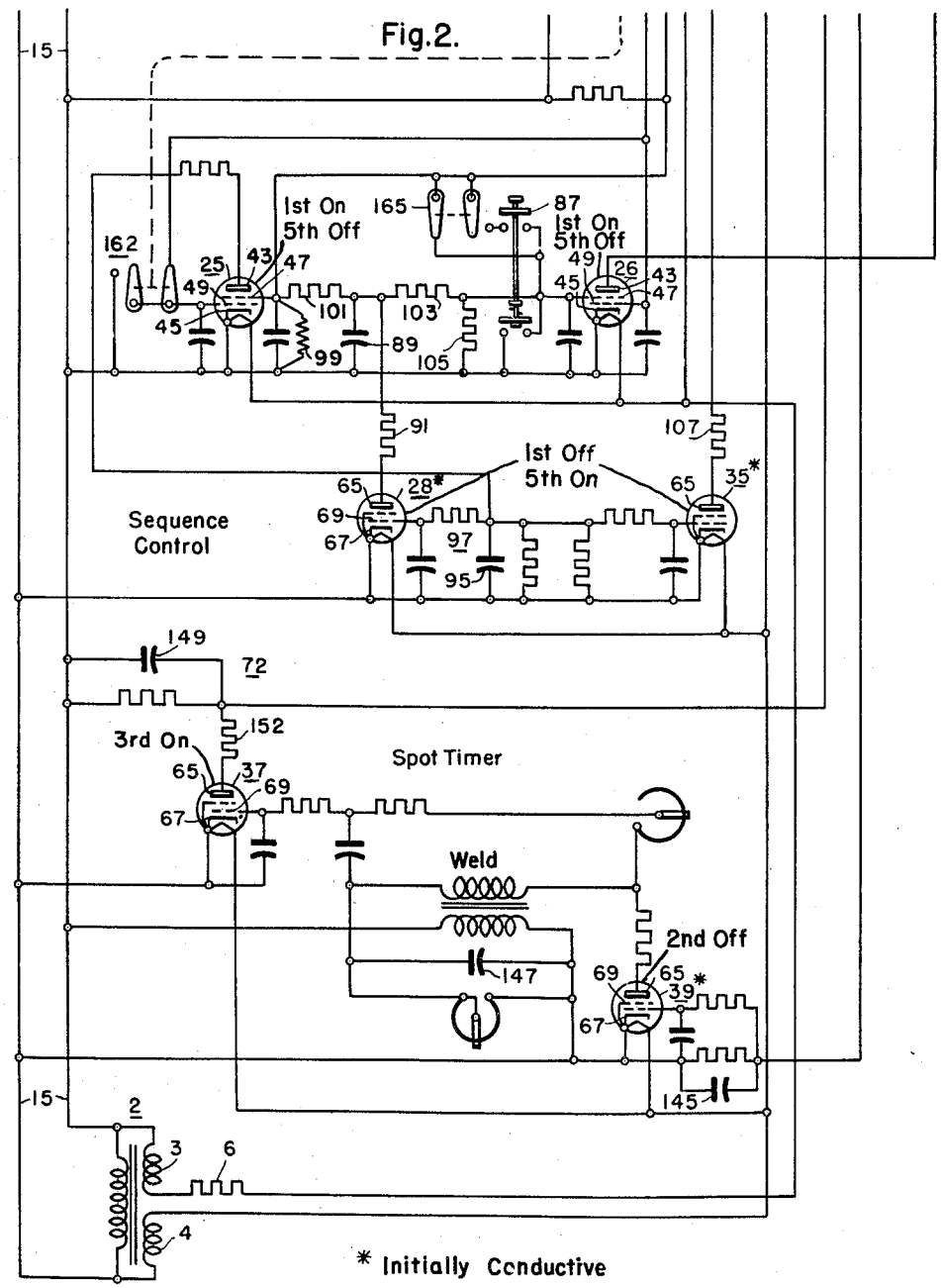
WITNESSES:
INVENTOR
Edward C. Hartwig.
BY
ATTORNEY United States Patent Office 2,866,134
Patented Dec. 23, 1958

2,866,134
ELECTRONIC SEQUENCE TIMER

Edward C. Hartwig, Walnut Creek, Calif., assignor to Westinghouse Electric Corporation, East Pittsburgh, Pa., a corporation of Pennsylvania Original application April 7, 1950, Serial No. 154,649. Divided and this application July 10, 1953, Serial No. 367,248

21 Claims. (Cl. 315—252)

My invention relates to electric discharge apparatus and it has particular relation to apparatus for timing a succession of events, each of which is to persist for a predetermined time interval.

This application is a division of an application Serial No. 154,649, filed April 7, 1950 and assigned to Westinghouse Electric Corporation, of which the applicants are Clarence B. Stadum, William E. Large and myself.

My invention has particular application to resistance welding. A resistance welding operation is initiated by the closing of a start switch which actuates a sequence timer. After the switch is closed, the electrodes are engaged with the work under pressure. This event takes place according to the operation of the sequence timer during a time interval of proper length called the Squeeze interval. Following the Squeeze interval, the flow of welding current takes place during an interval which is called the Weld interval. When the flow of welding current is interrupted, the welding electrodes are maintained in engagement with the material during a so-called Hold interval until the weld hardens. The electrodes are then disengaged from the material and maintained in disengagement during a so-called Off interval so that the material may be reset for a second operation. If the welder is set for Repeat operation and the start switch is maintained closed, the above-described sequence of events is repeated a number of times and a series of welds are produced. If the welding is set for Non-Repeat operation, the start switch must be reopened and reclosed after the completion of each Hold interval.

An example of such a sequence timer is disclosed in the Hartwig application, "Electronic Sequence Timer," Serial No. 47,812, filed September 4, 1948 now U. S. Patent No. 2,533,369, in which the circuit shown in Fig. 1 includes a start relay with lock-in contacts 109 which maintains the operation of the circuit after the start switch 103 is released. The use of such a relay is objectionable in some applications because the relays frequently need replacement. In fact, the life of an electromagnetic sequence timer is, to a large extent, limited by the life of the electromagnetic relay available for sequence timer service.

The relatively short life of timer relays is a result of certain design considerations. Such relays are actuated by current flow through thyratrons. For economy reasons, the thyratrons are of low current carrying capacity and the sequence relays are relatively light. Such relays are operated many times and are subject to unusual wear and tear. Since they are of light construction, the relays soon wear out.

It is, therefore, an object of my invention to provide a timer devoid of electromagnetic relays for locking into operation the timer after release of a momentary start switch.

It is another object of my invention to provide an electronic sequence control having an electronic circuit for locking in the initiating circuit.

According to my invention, I provide a sequence timer including two electronic start valves, one of which conducts current to actuate the hydraulic valve which closes the welding electrodes; the other locks in the sequencing operation. Such a circuit allows the operator to release the manual start switch without interrupting the sequence of operation.

Prior art sequencing controls of which I am aware employ a start switch placed across the control transformer secondary. Such a switch has impressed between its terminals a nominal potential of 115 volts. It has been found that the presence of such a voltage in the region in which the operator may be working might be dangerous.

It is, therefore, an object of my invention to provide an electronic sequence control operated by an initiating switch across which a voltage substantially less than the line voltage is impressed.

It is a more general object of my invention to provide a circuit which can be operated with safety by inexperienced operators.

It is an ancillary object of my invention to provide a start switch by operation of which the operator can close the welding electrodes for any desired time before welding current begins to flow.

In accordance with my invention, the start switch connects the grids of the start valves to their respective cathodes and thereby initiates conduction by closing a circuit which operates at a potential of the order of 30 volts. A switch is also employed which connects the grid of one of the start valves to its cathode. Current flowing through this valve actuates the solenoid valve which controls the movement of the welding electrodes. If this switch is depressed further, the sequence operation is started.

In certain sequence timers, such as is shown in the E. C. Hartwig application, Serial No. 47,812, proper operation can only be obtained if proper valves, in this case the thyratrons 35, 39 and 41 of Fig. 1, are initially conductive. The circuit is such, however, that when current flows to the transformer 55, thyratrons 39, 37 and 31 are subjected to full line voltage, the same voltage as is applied to the thyratrons 27, 35, 39 and 41 which are expected to be initially conductive. Having the same electrical characteristics, the various valves are equally likely to become initially conductive. If, for example, the thyratron 31 becomes conductive first, it charges the capacitor 89 and thereby prevents the thyratron 41 from becoming initially conductive. Yet the time can operate properly only if thyratron 41 is initially conductive.

It is, therefore, an object of my invention to provide an electronic timing circuit whereby valves which are not to be initially conductive are maintained non-conductive until the valves which are required to be initially conductive are fired.

It is another object of my invention to provide an electronic timing circuit for delaying the firing of certain thyratrons without affecting the conduction of the other thyratrons.

It is a further object of my invention to provide a simple and inexpensive circuit for delaying the initial conduction of hot cathode electron valves.

My invention is adapted for use with an electronic sequence timer which employs a number of electron tubes, usually thyratrons, which operate to initiate a number of events in a certain sequence and at the proper time. These thyratrons are of the hot cathode type.

My invention arises from the realization that the time that elapses before a hot cathode electron tube becomes conductive is dependent, in part, upon the rapidity with which its cathode is heated.

In accordance with my invention, I provide a circuit in which a resistor is connected in series with the heater of each thyratron which should not be initially conductive. The initially conductive thyratron circuits include no such resistor.

The novel features which I consider characteristic of my invention are set forth with particularity in the appended claims. The invention itself, however, both as to its organization and method of operation together with additional objects and advantages thereof will best be understood from the following description of a specific embodiment when read in connection with the attached drawings in which:

Figs. 1 and 2 taken together are a circuit diagram showing a preferred embodiment of my invention.

The apparatus shown in the drawings includes a welding transformer 5 across the secondary of which welding electrodes 7 and 9 are connected. One of these electrodes 7 may be moved into and out of engagement with the work 11 by operation of a hydraulic system 13. Power is supplied to the primary of the transformer 5 from buses 15, which may be the buses of a commercial supply of 200 to 2300 nominal voltage rating, through a pair of ignitrons 17 and 19 connected in antiparallel between the buses and the primary. Firing thyratrons 21 and 23 respectively are provided for the ignitrons 17 and 19. These thyratrons become conductive in response to impulses from the secondaries 20 and 22 of the firing transformer 24.

The operation of the welding electrodes 7 and 9 and the supply of welding current is controlled from a sequence timer devoid of sequencing electromagnetic relays. This timer determines the duration and the order of occurrence of the Squeeze, Weld, Hold and Off intervals. It includes initiating thyratrons 25, 26 and 28, Squeeze, Weld and Hold thyratrons 29, 31, and 33, respectively, and a plurality of auxiliary thyratrons 35, 37, 39 and 41 respectively. The Squeeze thyratron 29 and two of the start thyratrons 26 and 25 are necessarily of the type having an anode 43, a cathode 45 and a plurality of control electrodes 47 and 49; the others may be of the same type but may be as shown of the type having an anode 65, a cathode 67 and only one control electrode 69. While the valves are thyratrons in the preferred practice of my invention, certain or all of the valves may under some circumstances, be high vacuum electric discharge devices, ignitrons or discharge devices of other types.

The valves of the sequence timer have cathodes heated by power from the heating transformer 2. The heating transformer has two secondaries 3 and 4. The first secondary 4 is connected directly to the heater elements, while the second secondary 3 is connected through a resistor 6 to other heater elements.

The first secondary 4 provides heating current for the thyratrons 37, 39, 35, 28 and 33 which are initially conductive. The second secondary 3 is connected to the thyratrons 26, 25, 31, 41, and 29 which must not be initially conductive.

The windings of the transformer 2 are such that the first secondary 4 impresses rated voltage on the heater connections. The second secondary 3 impresses rated voltage on the heater only when rated current is flowing. When the heater circuit is first closed all the heaters take more than rated current. The first secondary 4 still impresses rated voltage on the heater, but a portion of the voltage impressed by the second secondary 3 appears across the resistor 6. The heaters of the thyratrons connected to the second secondary 3, then, are subject to less than rated voltage. The thyratrons on which rated voltage is impressed will heat up faster than those connected to the second secondary 3 and become conductive first. By means of this circuit arrangement, the thyratrons which are required to be initially conductive will heat up and become conductive first. The arrangement of the timer circuit is such that proper operation follows if the correct thyratrons are initially conductive.

Between the control electrodes 69 and the cathode 67 of the Weld thyratron 31 and the Hold thyratron 33 are connected the Weld and Hold time constants networks 72 and 76, respectively. Between the control electrodes and cathodes of the Squeeze, Hold and Start thyratrons 29, 33, 25 and 26 is a potentiometer and a transformer secondary. The voltage in the primary of these transformers is phase shifted so that the voltage peak through the secondary comes early in the positive half cycle between the anode and cathode of the Squeeze, Hold and Start thyratrons. The Squeeze thyratron 29 is connected to the control grid 71 of the heat control thyratron 73 to bias it to conductivity during the weld interval. Two auxiliary heat control thyratrons 75 and 77 are connected in series with the heat control thyratron 73. A variable DC bias 79 is connected between the cathode 81 and the control grids 83 of the auxiliary thyratrons 75 and 77. A transformer variable phase shifter 85 provides a firing voltage. The heat control circuit is coupled through a transformer 24 to the thyratrons 21 and 23 which fire the welding ignitrons 17 and 19.

When the power switch for the apparatus is closed, thyratrons 28 and 35 immediately become conductive. Thyratron 28 charges capacitor 89 maintaining thyratrons 25 and 26 non-conductive. Thyratron 35 charges capacitor 109 of the Squeeze network 111 maintaining thyratrons 29 and 41 non-conductive. Since thyratron 29 is non-conductive, the Heat Control network is non-conductive. Since thyratron 41 is non-conductive, capacitor 145 is discharged and thyratron 39 is conductive. Thyratron 39 charges capacitor 147 maintaining thyratron 37 non-conductive. Since thyratron 37 is non-conductive, capacitor 149 of network 72 is discharged and thyratron 31 is conductive. Thyratron 31 charges capacitor 151 of the Hold network, maintaining thyratron 33 non-conductive. Capacitor 155 of the Off network is discharged, but thyratron 26 is not affected; it is held off by capacitor 89.

To initiate operation of the circuit, the start switch 87 is closed. Prior to closure of the start switch 87, an auxiliary thyratron 28 is conducting current to charge the timing capacitor 89 through a resistor 91. The charge on the capacitor 89 normally maintains the start tubes 25 and 26 non-conductive. Closure of the start switch 87 connects the grids 47 of tubes 25 and 26 to their cathodes 45, thus initiating conduction through them. Current conducted through the first start tube 26 actuates the solenoid 93 of the hydraulic mechanism 13 to close the welding electrodes on the work piece. Current conducted by the second start tube 25 charges the capacitor 95 of the time constant circuit 97 associated with the auxiliary tube 28. The capacitor 95, when charged, causes the potential of the grid 69 of the auxiliary thyratron 28 and the grid 70 of auxiliary thyratron 35 to become negative with respect to the cathodes 67 and the auxiliary thyratrons 28 and 35 become non-conductive.

The value of the resistors 99, 101, 103, 105 is so chosen that the potential impressed across the timing capacitor 89 when the auxiliary tube 28 is conductive is approximately 28 volts R. M. S. if a 115 volt power source is used. Thus, the start switch 87 closes a circuit across which is impressed approximately 28 volts instead of the usual 115 volts impressed across the start switch in conventional circuits.

The second auxiliary thyratron 35 becomes non-conductive when the first auxiliary thyratron 28 becomes non-conductive. Prior to initiation of operation of the sequence timer, the second auxiliary thyratron 35 has been conductive, charging through a resistor 107 the capacitor 109 of the Squeeze time constant circuit 111. When the second auxiliary thyratron 35 becomes non-conductive, the Squeeze time capacitor 109 discharges through the resistor 113 and the potentiometer 115. The potentiometer 115 can be varied to vary the time constant of this network 111 and, accordingly, the Squeeze time.

After a period of time determined by the setting of the potentiometer 115, the bias presented by the time constant network 111 is sufficiently low that the voltage across a portion of potentiometer 117 causes the auxiliary thyratron 41 to become conductive early in the positive half cycle of voltage between its anode 65 and cathode 67. The control grid of the Squeeze thyratron 29 is connected to the same timing circuit 111. The Squeeze thyratron 29, therefore, becomes conductive when the auxiliary thyratron 41 becomes conductive. The thyratron 29, when conductive, charges the capacitor 119 in the grid circuit of the heat control thyratron 73. The voltage across capacitor 119 is added to the voltage across the biasing capacitor 121 to cause the heat control tube 73 to become conductive. The resistor 123 in parallel with capacitor 119 is of such value that the capacitor 119 retains its charge long enough to cause the tube 73 to conduct two pulses of current during every cycle of the control voltage.

Impressed across the heat control thyratron 73 is the voltage between the midtap 125 and one end of the secondary 127 of the transformer 129. During one half cycle of the supply the heat control thyratron 73 conducts electron current through the resistor 131, a portion of the secondary 127, the primary 133 of the firing transformer 24, the current limiting resistor 135 to the heat control thyratron 73. The current flowing through transformer primary 133 is insufficient to provide a firing pulse to the firing tubes. When current of the other polarity is impressed across the transformer secondary 127, the heat control thyratron 73 conducts electron current through the other part of the transformer secondary 127, through the primary 133 of the firing transformer 24, and the current limiting resistor 135, to the heat control thyratron 73. The thyratron 75 connected across resistor 131 and thyratron 77 are held non-conductive by voltage impressed by a phase shift circuit 85 connected to another secondary 139 of transformer 129 and the constant negative bias impressed across the heat control potentiometer 79. The variable direct-current voltage impressed between the cathodes 81 and control grids 83 controls the bias of thyratrons 75 and 77 and thereby varies the point in the cycle at which the thyratrons 75 and 77 fire. A portion of the control is provided by the potentiometer 141 in the phase shift circuit 85. The potentiometer 141 determines the phase of the alternating current impressed on the grids 83 of tubes 75 and 77. When the phase shift circuit 85 causes thyratrons 75 to be conductive during the positive half cycles between their anodes and cathodes, the resistor 131 is effectively short-circuited and a greater current is conducted through the primary 133 of the firing transformer 24.

The voltage impressed across the secondary 133 of the transformer 24 adds to the bias 143 causing the firing tubes 21 and 22 to become conductive, firing the ignitrons 17 and 19 and initiating the flow of welding current.

Thus, the direct-current voltage impressed across the potentiometer 79 and the setting of the phase shift potentiometer 141 determine the points in the voltage wave at which the tubes 75 and 77 become conductive. The phasing of the conduction of tubes 75 and 77 in turn determines the part of the cycle in which a firing pulse is transmitted from transformer 24 to the grids of the firing tubes 21 and 23 and therefore determines the point in the cycle at which the ignitrons 17 and 19 become conductive. The point at which the ignitrons 17 and 19 become conductive determines the weld current which flows through the welding electrodes.

Returning to the sequence timer, the grid of the auxiliary thyratron 41 is connected to the first control grid of the Squeeze thyratron 29. When the thyratron 29 becomes conductive to start welding current, the thyratron 41 becomes conductive, charging the capacitor 145 in a time constant circuit which is connected to the grid of auxiliary thyratron 39. The thyratron 39, which is initially conductive to charge the capacitor 147, becomes non-conductive. When fully charged, capacitor 147 biases thyratron 37 to non-conductivity. At the end of a predetermined time after thyratron 39 becomes non-conductive, the capacitor 147 discharges sufficiently to allow thyratron 37 to become conductive. The time constant circuit including capacitor 147 determines the Weld time. Current flow through thyratron 37 charges capacitor 149 through resistor 152, thereby making the suppressor grid 47 of thyratron 29 negative with respect to the cathode 45. Thyratron 29 then becomes non-conductive. Current no longer flows to capacitor 119 in the heat control circuit and thyratron 73 is maintained non-conductive by the bias voltage impressed on its capacitor 121. The voltage across capacitor 149 also biases the previously conductive thyratron 31 to non-conductivity. The thyratron 31 has charged capacitor 151 through resistor 153. The capacitor 151, and the potentiometer 154 constitute the Hold time-constant circuit. The capacitor 151 discharges and, at the end of a predetermined time, presents a bias low enough to allow the thyratron 33 to become conductive. The thyratron 33 then charges capacitor 155 through resistor 157. Capacitor 155, potentiometer 159 and resistor 161 constitute the Off time-constant circuit.

After momentarily closing the start switch 87, the operator has released this switch and the grids 47 of tubes 25 and 26 are no longer connected to their cathodes 45. The now fully charged capacitor 155 presents a bias of such magnitude and polarity that the transformer secondary 163 cannot cause thyratrons 25 and 26 to become conductive. The capacitor 95 discharges through its resistor and thyratron 28 becomes conductive, charging capacitor 89 and again biasing thyratrons 25 and 26 to non-conductivity. The circuit is then in its initial condition and will reset the sequence of timing operations.

If the repeat switch 162 is thrown from the position shown, the second control grid 49 of tube 25 is connected to its cathode 45 and the charge on capacitor 155, connected to the control grid 47 prevents the start thyratron 25 from becoming conductive. Thyratron 28 remains conductive and operation of the sequence control stops.

If the repeat switch 162 is in the position shown, the control grid 49 is connected to capacitor 155. Capacitor 155 maintains the thyratron 25 non-conductive for a predetermined off period while the capacitor 155 discharges. Then thyratron 25 becomes conductive charging capacitor 95 to make thyratron 28 non-conductive. When thyratron 28 becomes non-conductive, the sequence timer begins another cycle of operation.

The initiating switch 87 can be operated differently if the control switch 165 is thrown to the position not shown. After the control switch is thrown, the operator closes the start switch partly, thus connecting the grid of thyratron 26 to its cathode 45. This causes thyratron 26 to become conductive, actuating the coil 93 of the hydraulic mechanism 13 to close the welding electrodes 7 and 9. Then, if the operator desires, he can move the start switch 87 further, closing the other contacts and connecting the grid of thyratron 25 to its cathode 45. This initiates the timing operation of the welding sequence.

While I have shown and described a specific embodiment of my invention, I am aware that many modifications thereof are possible without departing from the spirit of the invention. For example, the various thyratrons of Fig. 1 are illustrated as the indirectly heated type although a number of other types of tubes would operate satisfactorily. It is, accordingly, not my intention to limit my invention to the specific embodiment shown and described.

I claim as my invention:

1. In combination, a first valve having an anode, a cathode and a control electrode, terminals for connecting a load in the circuit with the anode and cathode of said first valve, a second valve having an anode, a cathode and a control electrode, an impedance connected in the anode-cathode circuit of said second valve, connections between said impedance and the control electrode of said first valve such that, when current is flowing to said impedance, said impedance causes the control electrode of the first valve to be biased toward non-conductivity, a third valve having an anode, a cathode, and a control electrode connected to said impedance in the same manner as the control electrode of said first valve, a second impedance connected in the anode-cathode circuit of said third valve, and connections between said second impedance and the control electrode of said second valve to cause said second valve to be biased to non-conductivity when current is flowing to said second impedance.

2. In combination, a first valve having an anode, a cathode and a control electrode, terminals for connecting a load in circuit with the anode and cathode of said first valve, a second valve having an anode, a cathode and a control electrode, and an impedance connected in the anode-cathode circuit of said second valve, connections between said impedance and the control electrode of said first valve such that, when current is flowing to said impedance, the control electrode of the first valve is biased toward non-conductivity, a third valve having an anode, a cathode, and a control electrode connected to said impedance in the same manner as the control electrode of said first valve, a second impedance connected to conduct current in the anode-cathode circuit of said third valve, and connections between said second impedance and the control electrode of said second valve to cause said second valve to be biased to non-conductivity when current is flowing to said second impedance, a switch for connecting the control electrodes of said first and said third valves to a point which is at such a potential relative to their respective cathodes that said control electrodes allow said valves to become conductive.

3. In combination, a first valve having an anode, a cathode and a control electrode, terminals for connecting a load in circuit with the anode and cathode of said first valve, a second valve having an anode, a cathode and a control electrode, and an impedance connected in the anode-cathode circuit of said second valve, connections between said impedance and the control electrode of said first valve such that, when current is flowing to said impedance, the control electrode of the first valve is biased toward non-conductivity, a third valve having an anode, a cathode, and a control electrode connected to said impedance in the same manner as the control electrode of said first valve, a second impedance connected to conduct current in the anode-cathode circuit of said third valve, and connections between said second impedance and the control electrode of said second valve to cause said second valve to be biased to non-conductivity when current is flowing to said second impedance, a switch for connecting the control electrodes of said first and said third valves to their respective cathodes.

4. In combination, a first valve having an anode, a cathode and a control electrode, terminals for connecting a load in circuit with the anode and cathode of said first valve, a second valve having an anode, a cathode and a control electrode, and an impedance connected in the anode-cathode circuit of said second valve, connections between said impedance and the control electrode of said first valve such that, when current is flowing to said impedance, the control electrode of the first valve is biased toward non-conductivity, a third valve having an anode, a cathode, a first control electrode and a second control electrode said second control electrode being connected to said impedance in the same manner as the control electrode of said first valve, a second impedance connected to conduct current in the anode-cathode circuit of said third valve, and connections between said second impedance and the control electrode of said second valve to cause said second valve to be biased to non-conductivity when current is flowing to said second impedance, and terminals for impressing a control potential between the cathode and the first control electrode of said third valve.

5. In combination, a first valve having an anode, a cathode and a control electrode, terminals for connecting a load in circuit with the anode and cathode of said first valve, a second valve having an anode, a cathode and a control electrode, an impedance connected in the anode-cathode circuit of said second valve, connections between said impedance and the control electrode of said first valve such that, when current is flowing to said impedance, the control electrode of the first valve is biased toward non-conductivity, a third valve having an anode, a cathode, and a control electrode connected to said impedance in the same manner as the control electrode of said first valve, a second impedance connected to conduct current in the anode-cathode circuit of said third valve, and connections between said second impedance and the control electrode of said second valve to cause said second valve to be biased to non-conductivity when current is flowing to said second impedance, switching means for connecting the control electrode of said first valve to the cathode of said first valve and switching means for connecting the control electrode of said third valve to the cathode of said third valve.

6. In combination, a first valve having an anode, a cathode and a control electrode, terminals for connecting a load in circuit with the anode and cathode of said first valve, a second valve having an anode, a cathode and a control electrode, and an impedance connected in the anode-cathode circuit of said second valve, connections between said impedance and the control electrode of said first valve such that, when current is flowing in said impedance, the control electrode of the first valve is biased toward non-conductivity, a third valve having an anode, a cathode, a first control electrode and a second control electrode said second control electrode being connected to said impedance in the same manner as the control electrode of said first valve, a second impedance connected to conduct current in the anode-cathode circuit of said third valve, and connections between said second impedance and the control electrode of said second valve to cause said second valve to be biased to non-conductivity when current is flowing to said second impedance, a time constant circuit comprising an energy storage component and a component for discharging said energy storage component, and connections between said time constant network and said first control grid in said third valve for controlling the conductivity of said third valve.

7. In combination, a first hot cathode electric valve, a second hot cathode electric valve, means for supplying voltages to the principal circuits of said first and second valve simultaneously, a first network for supplying a voltage to the cathode of said first valve, a second network for supplying a voltage to the cathode of said second valve, said networks being adapted to supply said voltages simultaneously and said second network being of a higher resistance than said first network, and said second network being adapted to supply a voltage greater than the rated voltage of said second heater by an amount equal to the voltage absorbed by its higher resistance when rated current is flowing in said second heater.

8. In combination, a solenoid, first, second and third electric valves, connections between said first electric valve and said second and third electric valves adapted to prevent conduction of said second and third electric valves when said first electric valve is conductive, connections between said first and said second electric valves adapted to prevent conduction of said first electric valve when said second electric valve becomes conductive, means adapted to initiate conduction of said second and third electric valves, means adapted, after a predetermined time to render said second electric valve conductive, and connections between said solenoid and said third electric valve whereby said solenoid may be energized through said third valve.

9. Apparatus for controlling the supply of power from a source to a solenoid comprising in combination a first, second and third electric valve each having an anode, a cathode and a control electrode, connections between said first electric valve and said second and third electric valves to prevent conduction of said second and third electric valves when said first electric valve is conductive, connections between said first and said sescond electric valves to prevent conduction of said first electric valve when said second electric valve becomes conductive, a switch for connecting respectively the control electrodes of said second and third electric valves and the cathodes of said second and third electric valves, means for rendering said second electric valve conductive after a predetermined time interval, and means adapted to connect said source of power and said solenoid through said third electric valve.

10. Apparatus for controlling the supply of current from a source of power to a solenoid comprising in combination first, second and third electric valves, connections between said first electric valve and said second and third electric valves to prevent conduction in said second and third electric valves when said first electric valve is conductive, connections between said first and said second electric valves to prevent conduction in said first electric valve when said second electric valve becomes conductive, means adapted to initiate conduction in said second and third electric valves, and means to render said second electric valve non-conductive, after a predetermined time interval, and means adapted to connect said source of power and said solenoid through said third electric valve.

11. Apparatus for controlling the supply of current to a solenoid from a source of power comprising in combination a first, a second and a third electric valve, connections between said first electric valve and said second and third electric valves to prevent conduction in said second and third electric valves when said first electric valve is conductive, connections between said first and said second electric valves to prevent conduction in said first electric valve when said second electric valve becomes conductive, means to initiate conduction in said second and third electric valves, and means to render said second electric valve non-conductive after a predetermined time interval, and means adapted to connect said source of power and said solenoid through said third electric valve.

12. In combination, a first and second hot cathode electric valve so connected that, for proper operation of the circuit, the first valve must not become conductive before the second valve; heating elements for said valves; and means including a first network for connecting the heating element of said first valve to a source of current and a second network for simultaneously connecting the heating element of second valve to a source of current, said second network having higher resistance than said first network.

13. In combination, a first hot cathode electric discharge device, a second hot cathode electric discharge device, means connecting said discharge devices in a circuit in which said devices conduct in a predetermined succession, said second device conducting before said first device, and means including a first network for heating the cathode of said second device at a predetermined rate and a second network for simultaneously heating the cathode of said first device at a slower rate than said predetermined rate to delay the firing of said first device relative to said second device.

14. In combination, a first hot cathode electric discharge device, a second hot cathode electric discharge device, means for connecting said devices in a circuit in which they are to conduct in a predetermined succession, said second device conducting before said first device, means for supplying voltage to the principal circuits of said first and second devices simultaneously and means including a first network for applying a voltage of a predetermined magnitude to the cathode of said first device and a second network for simultaneously applying a voltage of a magnitude lower than said predetermined magnitude to the cathode of said second device.

15. In combination, a first hot cathode electric valve, a second hot cathode electric valve, means connecting said devices in a circuit in which said devices conduct in succession, said second device conducting before said first device, means for applying voltages to the principal circuits of said first and second valves simultaneously, and networks for applying voltages respectively to the cathodes of said first and second valves simultaneously with the application of voltages to said principal circuits of said valves, said networks for applying voltage to the cathode of said second valve including a higher resistance than said network for applying voltage to the cathode of said first valve.

16. In a timer for actuating a first means and a second means, said first means to be actuated first and to remain actuated during a first predetermined time interval, and said second means to be actuated a predetermined second time interval after said first means is actuated during said first interval and to remain actuated for a predetermined third interval; the combination comprising a first electric discharge device comprising an anode, a cathode and a control electrode; means in circuit with said first device for actuating said first means when said device is rendered conductive; a second electric discharge device having an anode, a cathode and a control electrode; means in circuit with said second device for actuating said second means said second interval after said second device is maintained conductive and for thereafter terminating the actuation of said second means at the end of said third interval and said first means at the end of said first interval; means for impressing a common blocking potential between said control electrodes and cathodes of said first and second devices; and manually actuable means for shunting said potential.

17. A system including a plurality of electric discharge devices each having a hot cathode, said discharge devices being connected in a circuit which includes a heater circuit for each said hot cathode and in which during a standby phase power is supplied simultaneously to all said devices and during said standby phase certain of said devices are initially non-conductive while others are conductive and during an operating phase following said standby phase said devices are rendered conductive and non-conductive in a predetermined succession; said system being characterized by cathode heater circuits for those of said devices which are to be initially non-conductive during said standby phase having higher resistance than the cathode heater circuits of the devices which are to be initially conductive.

18. A sequence timer including a start discharge device having an anode, a cathode and a control electrode, a plurality of additional discharge devices, a plurality of timing networks, means interconnecting said start device and said additional discharge devices so that on the conduction of said start device the conductivity of said additional devices is changed in a predetermined sequence, means interconnecting said additional devices and said networks so that on the change in conductivity of said additional devices as aforesaid, intervals are timed in a predetermined succession, means connected between said control electrode and cathode for impressing a potential between said control electrode and cathode for impressing a potential between said control electrode and cathode to maintain said start device non-conducting in the stand-by condition of said sequence timer, and switch means connected to said control electrode and cathode for suppressing said potential.

19. A sequence timer for a welder having means to be actuated for applying pressure to work to be welded including a start discharge device having an anode, a cathode and a control electrode, a squeeze discharge device, said squeeze device having an anode, a cathode and a control electrode, means connecting said last-named anode and cathode to said pressure applying means so that when said squeeze device is conducting said pressure applying means is actuated, a plurality of additional discharge devices, a plurality of timing networks, means interconnecting said start device and said additional discharge devices so that on the conduction of said start device the conductivity of said additional devices is changed in a predetermined sequence, means interconnecting said additional devices and said networks so that on the change in conductivity of said additional devices as aforesaid intervals are timed in a predetermined succession, means connected between said control electrodes and cathodes for impressing potentials between said control electrodes and cathodes to maintain said start and squeeze devices nonconducting in the stand-by condition of said sequence timer, and switch means connected to said control electrodes and cathodes for suppressing said potentials.

20. A sequence timer including a start discharge device having an anode, a cathode and a first control electrode and a second control electrode, a plurality of additional discharge devices, a plurality of timing networks, means interconnecting said start device and said additional discharge devices so that on the conduction of said start device the conductivity of said additional devices is changed in a predetermined sequence, means interconnecting said additional devices and said networks so that on the change in conductivity of said additional devices as aforesaid intervals are timed in a predetermined succession, means connected between said first control electrode and cathode for impressing a potential between said control electrode and cathode to maintain said start device non-conducting in the stand-by condition of said sequence timer, switch means connected to said control electrode and cathode for suppressing said potential, and means connected to said additional devices and said second control electrode and cathode and responsive to the end of the timing of said succession of intervals for impressing a potential between said second control electrode and cathode to render said start device non-conducting.

21. A sequence timer including a start discharge device having an anode, a cathode and a first control electrode and a second control electrode, a plurality of additional discharge devices, a plurality of timing networks, a stop discharge device, means interconnecting said additional devices and said stop device so that at the end of the timing of said intervals said stop device is rendered conducting, means interconnecting said start device and said additional discharge devices so that on the conduction of said start device the conductivity of said additional devices is changed in a predetermined sequence, means interconnecting said additional devices and said networks so that on the change in conductivity of said additional devices as aforesaid intervals are timed in a predetermined succession, means connected between said first control electrode and cathode for impressing a potential between said control electrode and cathode to maintain said start device non-conducting in the stand-by condition of said sequence timer, switch means connected to said control electrode and cathode for suppressing said potential, and means connecting said stop device and said second control electrode and cathode for impressing a potential between said second control electrode and cathode to render said start device non-conducting on the conduction of said stop device.

References Cited in the file of this patent

UNITED STATES PATENTS

| | | |
|---|---|---|
| 873,958 | Von Pirani | Dec. 17, 1907 |
| 1,223,589 | Kloneck | Apr. 24, 1917 |
| 1,393,018 | Hewitt | Oct. 11, 1921 |
| 1,858,323 | Crouse | May 17, 1932 |
| 1,973,123 | Stogoff | Sept. 11, 1934 |
| 2,014,174 | Francis | Sept. 10, 1935 |
| 2,067,520 | Curtis | Jan. 12, 1937 |
| 2,121,760 | Lowry | June 21, 1938 |
| 2,325,789 | Miller | Aug. 3, 1943 |
| 2,428,126 | Nicholson | Sept. 30, 1947 |
| 2,454,410 | Snyder | Nov. 23, 1948 |
| 2,465,185 | Anderson | Mar. 22, 1949 |
| 2,623,146 | Anger | Dec. 23, 1952 |